(12) United States Patent
Bruce (10) Patent No.: US 6,887,035 B2
(45) Date of Patent: May 3, 2005

(54) TRIBOLOGICALLY IMPROVED DESIGN FOR VARIABLE STATOR VANES

(75) Inventor: Robert W. Bruce, Loveland, OH (US)

(73) Assignee: General Electric Company, Schenectady, NY (US)

( * ) Notice: Subject to any disclaimer, the term of this patent is extended or adjusted under 35 U.S.C. 154(b) by 107 days.

(21) Appl. No.: 10/278,570

(22) Filed: Oct. 23, 2002

(65) Prior Publication Data

US 2004/0081554 A1 Apr. 29, 2004

(51) Int. Cl.[7] ............................................... F01D 17/16
(52) U.S. Cl. ..................................... 415/160; 415/229
(58) Field of Search ............................ 415/160, 209.3, 415/229

(56) References Cited

U.S. PATENT DOCUMENTS

| | | | |
|---|---|---|---|
| 3,764,189 A | * 10/1973 | Prostler et al. ............. 384/278 |
| 3,788,763 A | 1/1974 | Nickles | |
| 3,986,720 A | 10/1976 | Knudsen et al. | |
| 4,439,982 A | 4/1984 | Weiler et al. | |
| 4,621,976 A | 11/1986 | Marshall et al. | |
| 4,652,208 A | 3/1987 | Tameo | |
| 4,665,997 A | 5/1987 | Maurer et al. | |
| 4,767,264 A | 8/1988 | Kisling et al. | |
| 4,773,821 A | * 9/1988 | Gonthier et al. ............. 415/150 |
| 4,792,277 A | 12/1988 | Dittberner, Jr. et al. | |
| 4,850,794 A | 7/1989 | Reynolds, Jr. et al. | |
| 4,893,986 A | 1/1990 | Catterfeld et al. | |
| 4,967,550 A | 11/1990 | Acton et al. | |
| 5,037,269 A | 8/1991 | Halberg | |
| 5,125,796 A | 6/1992 | Cromer | |
| 5,136,839 A | 8/1992 | Armstrong | |
| 5,184,456 A | 2/1993 | Rumford et al. | |
| 5,207,558 A | 5/1993 | Hagle et al. | |
| 5,234,165 A | 8/1993 | Rhyne, Jr. | |
| 5,281,087 A | 1/1994 | Hines | |
| 5,308,226 A | 5/1994 | Venkatasubbu et al. | |
| 5,320,687 A | 6/1994 | Kipphut et al. | |
| 5,324,165 A | * 6/1994 | Charbonnel et al. ........ 415/160 |
| 5,370,838 A | 12/1994 | Sato et al. | |
| 5,374,323 A | 12/1994 | Kuhlman et al. | |
| 5,517,817 A | 5/1996 | Hines | |
| 5,549,448 A | 8/1996 | Langston | |
| 5,593,275 A | 1/1997 | Venkatasubbu et al. | |
| 5,659,205 A | 8/1997 | Weisser | |
| 5,664,890 A | 9/1997 | Nowak et al. | |
| 5,746,579 A | 5/1998 | Amos et al. | |
| 5,749,218 A | 5/1998 | Cromer et al. | |
| 5,760,289 A | 6/1998 | Skottegard | |
| 5,807,072 A | 9/1998 | Payling | |
| 6,086,327 A | 7/2000 | Mack et al. | |
| 6,106,766 A | 8/2000 | Kawai et al. | |
| 6,132,168 A | 10/2000 | Kovaleski et al. | |
| 6,162,034 A | 12/2000 | Mallen | |
| 6,170,990 B1 | 1/2001 | Hawkins | |
| 6,174,130 B1 | 1/2001 | King et al. | |
| 6,272,422 B2 | 8/2001 | Khalid et al. | |

FOREIGN PATENT DOCUMENTS

| EP | 0 545 656 A1 | 6/1993 |
|---|---|---|
| EP | 1 010 862 A3 | 6/2000 |

* cited by examiner

Primary Examiner—Ninh H. Nguyen
(74) Attorney, Agent, or Firm—McNees Wallace & Nurick LLC (57) ABSTRACT

A bushing and washer forming a bearing assembly at the outer radial end of a stator vane, the outer bearing assembly, and the bearing assembly at the inner radial end of the stator vane, the inner bearing assembly, that facilitate durability, effectiveness and reduced cost. Both the inner and outer bearing assemblies are designed to rotate relative to the vane shaft and the respective mating shroud or case to even out the wear around the circumference of the bushing. When a rotating bushing is used, a flange on the bushing is designed to be positioned on the inside of the case, so that a pressure differential across the case applies a force to the vane to move it outwardly against the flange and the flange against the case, thereby minimizing air leakage.

23 Claims, 3 Drawing Sheets

TRIBOLOGICALLY IMPROVED DESIGN FOR VARIABLE STATOR VANES

FIELD OF THE INVENTION

This invention relates generally to fan and compressor components of gas turbine engines, and in particular, to bushings and washers used with variable stator vanes in the compressor section of the engine.

BACKGROUND OF THE INVENTION

In gas turbine engines, for example, aircraft engines, air is drawn into the front of the engine, compressed by a shaft-mounted rotary compressor, and mixed with fuel. The mixture is burned, and the hot combustion gases are passed through a turbine mounted on a shaft. The flow of hot gases turns the turbine, which turns the shaft and powers the compressor. The hot exhaust gases flow from the back of the engine, providing thrust that propels the aircraft forward.

Gas turbine engines generally include a high pressure compressor for supplying combustion air to a combustor, and a turbine. The high pressure compressor, combustor, and turbine are collectively referred to as a core engine. Typically, gas turbine engines also include a low pressure compressor for supplying compressed air, for further compression, to the high pressure compressor, and a fan for supplying air to the low pressure compressor.

These compressors typically include a plurality of stages, each stage including in alternating configuration a rotor for moving the air axially and a fixed, radially oriented stator for efficiently directing the flow of air axially. The rotor typically includes an assembly of a plurality of blades radially attached to a rotating disk, the assembly surrounded by a casing. The casing is typically fabricated to be removable, such as by forming the casing into two halves that are then removably joined together. The casing supports the plurality of radially oriented, fixed stator vanes which are attached thereto, while the rotor supports the rotor blades. Each stage of stator vanes are positioned in front of a rotor with the attached blades to efficiently direct air flow to the blades of the rotor.

Variable stator vane assemblies are utilized to improve the performance of the engine. For better performance, the rotational speed of the fan and compressor usually need to be different. In general, the high speed compressor rotates about twice as fast as the fan. This is accomplished by attaching the compressor and fan to different spools or shafts which run concentric to each other. In this dual spool configuration, the high pressure compressor is connected to a high pressure turbine by an outer spool. In some configurations, three concentric spools are utilized. Each variable stator vane assembly includes a variable stator vane which extends between adjacent rotor blades. The variable stator vane is rotatable about a substantially radial axis. The orientation of the variable stator vane varies the stagger angle of the vane in a controlled fashion. This allows the vane or vanes to be realigned to change the impingement angle of compressed air on to the rotor blades as the operating condition of the engine changes. The position of the vane is changed by means of a lever arm attached to an actuator ring on the outside of the compressor case.

A known variable vane assembly includes a variable vane, a trunion bushing; and a washer. At an outer end, the variable vane assembly is bolted onto a high pressure compressor stator casing and the bushing extends concentrically through an opening in the casing. The washer is positioned above the casing and between the bushing and casing. The variable vane includes a vane stem that extends through the opening in the casing (hereinafter referred to as the "outer end") and through the bushing and washer. The bushing and washer are referred to herein as a bearing assembly, the bearing assembly positioned radially outboard referred to as the first bearing assembly. The vane also includes a second bearing assembly at its inner radial end. The vane may be shrouded at its inner end to minimize the vibrational effect of flow variations, particularly on the longer vanes. The bearing assembly produces a low friction surface that prevents metal on metal contact.

A lever arm is fixedly joined to the vane stem extending outwardly from the vane bushing or first bearing assembly. The distal end of the lever arm is operatively joined to an actuation ring that controls the angle of the vane. All of the vane lever arms in a single stage are joined to a common actuation ring for ensuring that all of the variable vanes are positioned at the same angular orientation relative to the airflow in the compressor stage.

Although known variable vane assemblies provide certain advantages as explained above, such vane assemblies have potential gas stream leakage paths which reduce engine efficiency. The primary leakage path is between the outside diameter of the airfoil portion, the stator vane stem, extending through the aperture in the compressor casing and the inside diameter of the bushing. The secondary leakage path is between the outside diameter of an optional metal jacket housing a portion of the bushing or alternatively, the bushing itself and the inside diameter of the aperture opening in the compressor stator casing. Other leakage paths are on either radial end at the airfoil where the airfoil joins the case and the shroud, as well as at the shroud seal, between the shroud and the rotor shaft. Additionally, the high velocity and high temperature of the air can cause oxidation and erosion of the bearing assemblies, which leads to premature failure of the bearing assembly, and eventual inability of the variable vane assembly to function. This will decrease engine efficiency and ability to rapidly respond to power demand changes.

Once the bearing assembly fails, an increase in leakage through the opening occurs, which results in a performance loss. In addition, failure of the bearing assembly can allow contact between the stator vane and the casing, which causes wear as a result of vibration and increases overhaul costs of the engine. Accordingly, it would be desirable to provide bearing assemblies fabricated from materials and of a design having performance characteristics that will reduce or eliminate air leakage between the stator vane stem and the compressor casing while providing an increase in the durability of the bushing and washer composition to increase part life. The present invention fulfills this need, and further provides related advantages.

BRIEF SUMMARY OF THE INVENTION

The present invention presents improvements to the bushing and washer forming the bearing assembly at the outer radial end of a stator vane, the outer bearing assembly, and the bearing assembly at the inner radial end of the stator vane, the inner bearing assembly that facilitate durability, effectiveness and reduced cost.

Both the inner and outer bearing assemblies are designed to rotate relative to the vane shaft and the respective mating shroud or case to even out the wear around the circumference of the bushing. However, the bushing is designed so that if the relative wear rate between the bushing material and the vane or the shroud/case is high, the bushing will not rotate relative to that material. When a rotating bushing is used, a flange on the bushing is designed to be positioned on the inside of the case, so that a pressure differential across the case applies a force to the vane to move it outwardly against the flange and the flange against the case, thereby minimizing air leakage.

The vane is designed to have an axial bearing face adjacent to a vane stem at each end, such that the axial bearing face bears against the bushing flange or a washer to minimize wear and friction. The axial bearing face has a larger diameter for harder, less wearing materials than the adjacent bushing flange and a smaller diameter than the adjacent bushing flange for a softer, more wearing surface to minimize edge effects and "digging-in" abrasion. This configuration can also be applied to a lever arm bearing face which rides against a bushing flange/washer located between it and the casing to reduce wear as the lever arm rotates. The sliding contact forces between the lever arm, vane stems and their respective shroud or case are fully carried by the bushings and washers for the design life of the assembly.

The present invention is also a bearing assembly for rotatively positioning a variable vane to an engine casing comprising a bushing wherein a first surface of the bushing contacts a variable vane stem; a second opposed surface of the bushing contacts the engine casing, and the bushing rotates relative to the variable vane stem and engine casing. The bushing may further include a surface positioned such that a pressure differential across the engine casing urges a vane assembly against the bushing, which in turn urges the bushing against an inside wall of the engine casing, thereby closing an air leakage path.

Advantages of the present invention are that the bearing assembly and associated, vane and case/shroud design extends system life, increases system temperature capability beyond known values, reduces air leakage and minimizes repair costs when the engine is refurbished. The extended system life of the bearing assembly allowing the variable stator vane to operate over the entire design life of the assembly translates to improved engine performance and lower operating cost of the engine.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
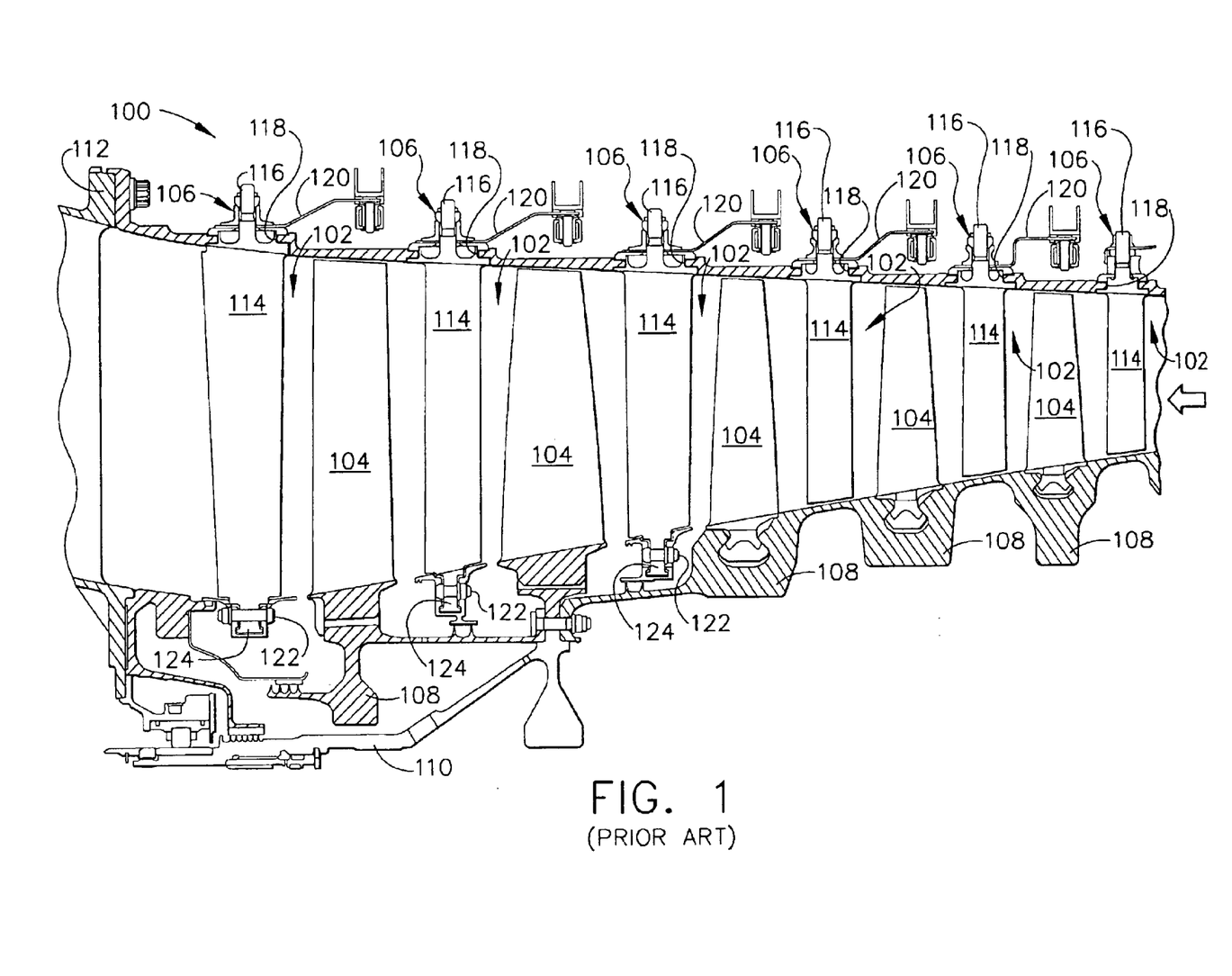
FIG. 1 is a schematic view of a section of a known high pressure compressor for a turbine engine.

FIG. 1 is a schematic view of a section of a portion of a typical compressor 100 for a turbine engine (not shown). Six variable stages are shown; however for large engines there typically are more stages, as many as thirteen or fourteen stages. The number of stages is not relevant as each stage operates in the same manner, the overall number of stages being an indication of the volume of air compressed and the degree of compression. A compressor 100 includes a plurality of stages 102, and each stage 102 includes a rotor disk 108 supporting a plurality of rotor blades 104 axially spaced from a set of radially oriented variable stator vane assemblies 106. Rotor disks 108 are assembled onto a rotor shaft 110. For simplicity, only a single spool is shown, however it will be understood by those skilled in the art that multiple spool designs are encompassed by this disclosure. Rotor shaft 110 is also connected at the aft end to a turbine (not shown). Rotor shaft 110 is surrounded by a stator casing 112 that supports variable stator vane assemblies 106 and provides a flow boundary. Vane assemblies may be shrouded at their radially oriented inner ends 124. These shrouds are not depicted.

Each variable stator vane assembly 106 includes a variable vane 114 and a vane stem 116. Vane stem 116 protrudes through an opening 118 in casing 112. Variable vane assemblies 106 further include a lever arm 120 extending from variable vane 114 that can be activated by a bellcrank mechanism and actuator (not shown) to rotate variable vanes 114. The orientation of vanes 114 relative to the flow path through compressor 100 directs air flow therethrough.

Variable vane assemblies 106 not only direct air flow through compressor 100, but also provide a potential leakage pathway to allow air be diverted and to exit compressor 100, such as through casing openings 118. This leakage through openings 118 reduces the efficiency of compressor 100.

Figure 2:
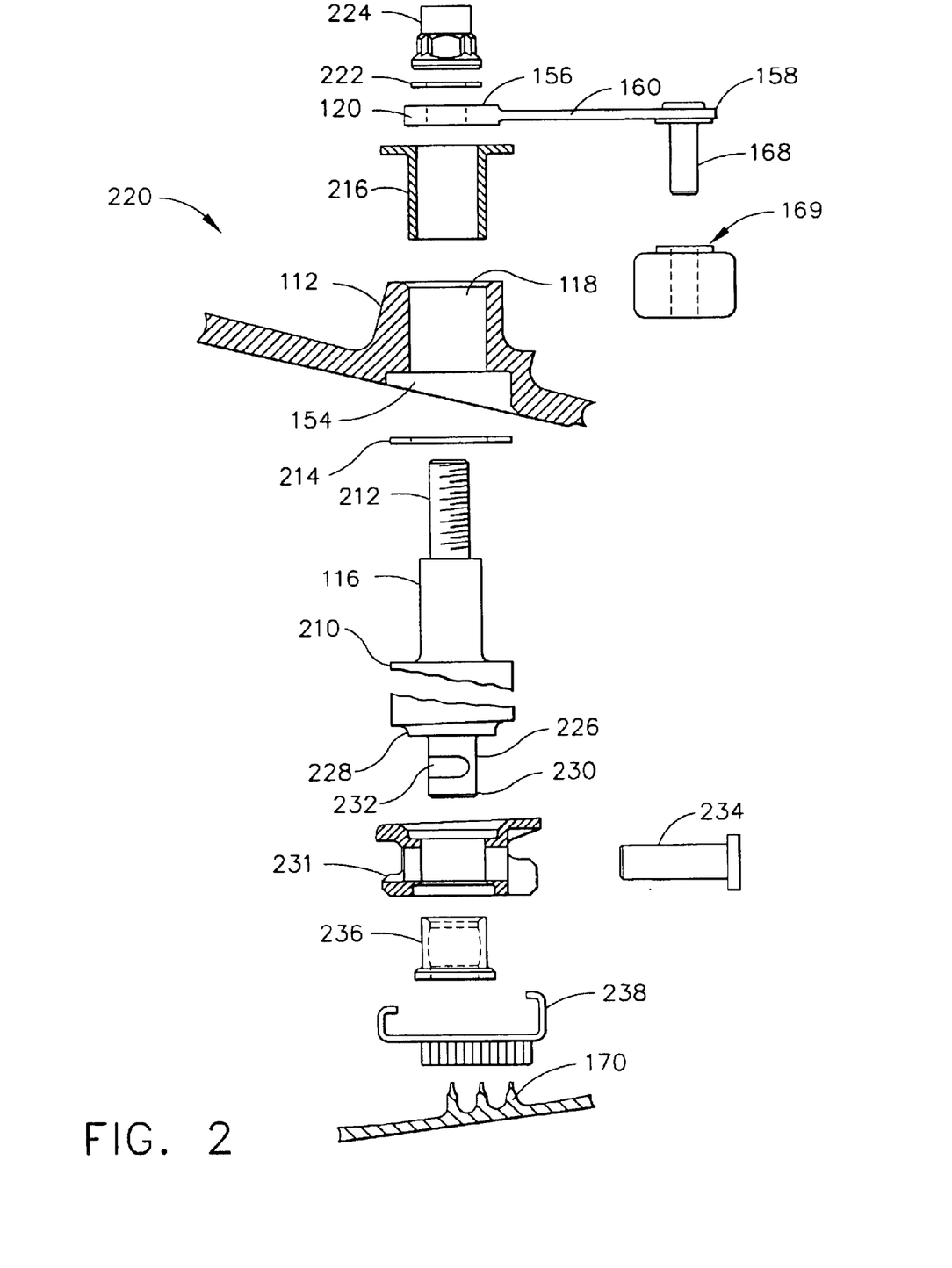
FIG. 2 is an exploded view of a typical variable stator vane assembly.

FIG. 2 is an exploded view of a variable vane assembly 106. Vane airfoil 210 is shown as a cutaway. Integral vane stem 116 is located at a radially outer end of vane airfoil 210. Vane stem 116 includes an attachment means 212, depicted here as a threaded connection, although any other equivalent connection method such as a spline arrangement may be used. Vane stem 116 extends through opening 118 in casing 112, again shown as a cutaway. Opening 118 includes a counterbore 154 which receives an inner washer 214. A bushing 216 slides into opening 118 and over upper vane stem 116, filling the remaining space in opening 118 and preventing contact between casing 112 and upper vane stem 116. This washer 214 may be replaced by the flange of a flanged rotating bushing, in which case a washer would separate the lever an 120 from the case. A first end 156 of lever arm 120 is assembled over vane stem 116 and is secured to vane stem 116 by a fastening means 224, here depicted as a locknut, that mates cooperatively with attachment means 212, depicted as a threaded end of upper vane stem 116, to secure fastening means 224 to vane stem 116. Lever arm 120 includes a second end 158 that is integrally attached to the first end 156 by a web 160. A projection 168 extends from second end 158 and is received by an aperture in actuation ring (not shown). A second bushing 169 fits over projection 168 and into the aperture in actuation ring (not shown) to prevent contact between actuation ring 164 and projection 168.

At the radially inner end of vane assembly 106, an integral lower vane shaft 226 extends radially inward from vane airfoil 210. Vane shaft 226 includes a first, large diameter 228 and a second smaller diameter 230. A bushing 236 is assembled over lower vane shaft 226, which is received by an optional shroud 231. A seal 238 is assembled radially inward of the shroud which is contacted by teeth 170 positioned on the rotating apparatus of the engine, the teeth wearing into seal 238 to form a barrier to air leakage. An optional third fastening means 234, depicted as a locking pin extending through at least one boundary of seal 238, through shroud 231, through bushing 236 and through aperture 232 in lower vane shaft 226 secures seal 238, bushing 236, and shroud 231 to lower vane shaft 226. When an optional fastening means 234 is employed, any other mechanical fastening means, such as for example a threaded bolt and locknut may be substituted for the lock pin. Optionally, a washer is place between the axial faced large diameter 228 and shroud 231.

Figure 3:
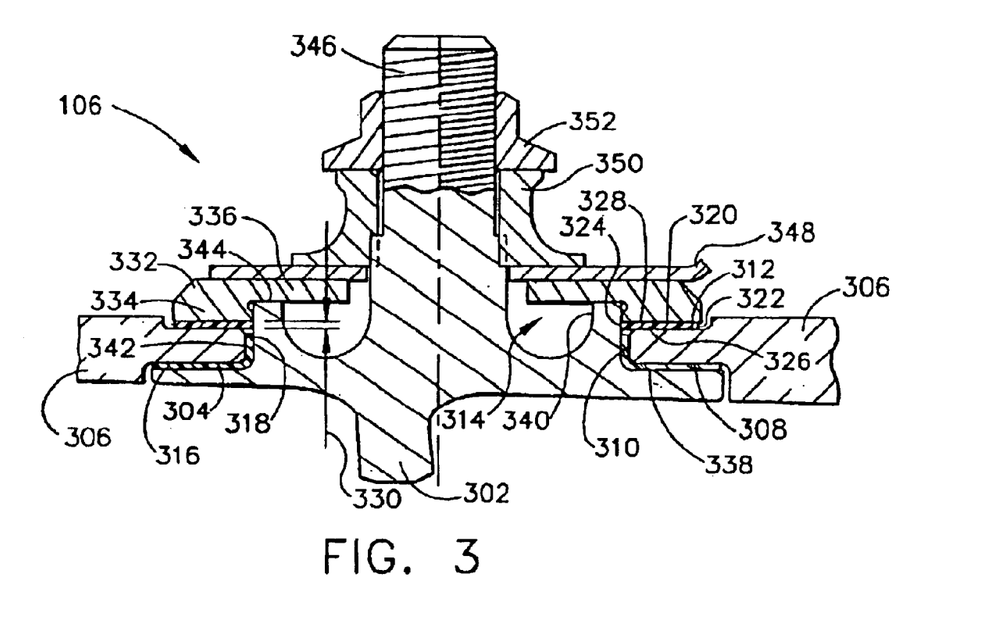
FIG. 3 is a schematic view of an assembled variable vane assembly.

FIG. 3 is a schematic view of a typical prior art variable vane assembly 106 at its upper end in the assembled condition. Variable vane assembly 106 includes a variable vane 302 shown in cutaway. A bushing 304 is positioned on variable vane 302. A casing 306 supports variable vane 302 and includes a first recessed portion 308, a second recessed portion 312, and an inner portion 310 connecting first recessed portion 308 and second recessed portion 312. An opening, such as opening 314 shown in FIG. 3, may be formed adjacent vane stem 302 above the airfoil portion of the vane.

Bushing 304 includes a first portion 316 and a second portion 318. Bushing first portion 316 is in direct contact with casing first recessed portion 308 and separates variable vane 302 from casing 306. Bushing second portion 318 contacts casing inner portion 310, being positioned between variable vane 302 and casing 306. Bushing first portion 316 extends substantially, but just less than, the entire length of casing first recessed portion 308. To minimize friction torque, this portion 316 may be tapered to provide the most intimate contact at a smaller radius In addition, bushing second portion 318 extends substantially an entire length of casing inner portion 310 and is substantially perpendicular to bushing first portion 316. Bushing 304 prevents variable vane 302 from directly contacting casing 306.

Variable vane assembly 106 further includes a washer 320. Washer 320 is substantially flat and includes an outer diameter surface 322 and an inner diameter surface 324. More specifically, washer 320 includes a first face 326, a second face 328, and a thickness 330 that is substantially constant from inner diameter surface 324 to outer diameter surface 322 as shown. This washer 320 may be slightly tapered or provided with a suitable profile to maximize existing torque by ensuring initially, that the most intimate contact with bushing 304 is at a smaller radius, Washer 320 is in direct contact with casing second recessed portion 312 and is coextensive with at least a portion of the length of casing second recessed portion 312.

Variable vane assembly 106 includes a spacer 332 in contact with washer 320. Washer 320 prevents contact between spacer 332 and casing second recessed portion 312. Spacer 332 includes a first portion 334 and a second portion 336. Spacer first portion 334 contacts washer 320 along its second face 328 and has a diameter substantially greater than the diameter of washer 320. The washer inner diameter is greater than the casing inner portion 310 as well as the inner diameter of spacer 332. Spacer 332 is separated from bushing 304 by washer 320. Bushing 304 and washer 320 do not contact each other. Washer 320 prevents spacer 332 from contacting casing 306.

Variable vane 302 also includes a first portion 338, a vane ledge inner surface 340 and a vane ledge vertical surface 342, and a vane spacer seating portion 344. Vane ledge inner surface 340 abuts and transitions to a vane stem fastening surface 346. Vane stem fastening surface 346 and vane ledge inner surface 340 extend through an opening 118 or aperture in casing 306. Bushing second portion 318 abuts against inner portion 310 of casing 306. Bushing second portion 318 prevents vane ledge vertical surface 342 from contacting casing inner portion 310.

Variable vane assembly 106 also includes a lever arm 348, shown partially in FIG. 3, positioned around vane vane 302 and contacting spacer 332 and sleeve 350. Lever arm 348 is moved by an actuator to adjust the angle of variable vane 302, and thus alter the direction of air flow through the compressor.

In addition, variable vane assembly 106 includes a sleeve 350 contacting lever arm 348, and a lever arm lock nut 352 contacting sleeve 350. Lever arm lock nut 352 cooperates with vane stem 346 in holding mating pieces in contact with one another maintaining variable vane assembly 106 securely against casing 306.

Variable vane assembly 106 is assembled by placing bushing 304 on variable vane 302 such that bushing first portion 316 and bushing second portion 318 contact variable vane 302 and are substantially between casing 306 and vane 302. Variable vane 302 and bushing 304 extend through opening 118 or aperture in casing 306.

Washer 320 is placed on casing 306 adjacent bushing 304. Spacer 332 is positioned on variable vane 302 and contacts washer 320. Lever arm 348 is positioned over vane stem 346 and contacts spacer 332. Sleeve 350 is positioned over vane stem 346 and contacts lever arm 348. Finally, lever arm lock nut 352 is positioned over vane stem 346 contacting sleeve 350, locking the assembly in place.

Washer 320 and bushing 304 are bearing surfaces in variable vane assembly 106 such as are found in a high pressure compressor. Washer 320 and bushing 304 may be utilized in other environments such as a low pressure compressor variable vane assembly or a turbine rotor vane assembly, their use in the turbine being restricted by their high temperature capability.

Solid bushings 304 and washers 320 are fabricated by known techniques, such as by injection molding or by high temperature sintering of ceramics. Ideally, the solid bushing 304 should be durable with effectively good wear characteristics. The bushing 304, which is readily replaceable, should wear before the casing 306 and vane stem 346, the casing 306 and vane stem 346 being made of more wear resistant materials. The bushing 304 is made of an inexpensive wear material which is easily replaceable and designed as a consumable item.

In a preferred embodiment, bushing 216 rotates relative to vane stem 116, the benefits of which have heretofore not been appreciated. Such rotation permits even wear around the circumference of the bushing where it contacts vane stem 116 and the casing 112, thereby improving the service life of bushing 216. This rotation is most beneficial when the wear rate between bushing 216 and vane stem 116 or casing 112 is relatively low, such as when the wear is less than about 0.0002 inches after sliding effectively about 50,000 feet while experiencing a load of about 25 lbs. However, if the wear rate between bushing 216 and vane stem 116 or casing 112 is relatively high, such as when the wear rate under comparable conditions is about 0.020 inches, bushing 304 is designed to not rotate against vane stem 346 or casing 206, in order to increase service life.

To determine the type of bushing 216 required in a design, physical properties, such as, for example, thermal expansion coefficient, operating temperature range, yield strength and elastic modulus of the mating materials, the forces exerted on the mating materials, wear per cycle and the number of cycles over the expected life are used to determine the relative wear that will be experienced in an application. The wear rate between materials can be determined and the expected wear for an application can be used to determine whether the bushing 216 should be allowed to rotate. For example, even if the wear rate is relatively low, as previously discussed, but galling occurs that causes excessive transfer of one material to the surface of the other, leading to severe roughening of the surfaces, the bushing material would be found to be unacceptable. The bushing 216 is to have an effective thickness sufficient to facilitate manufacturing ease (i.e. reduced cost) and wear life. Thus, if the expected wear during the life of the bushing is expected to be 0.0002, the minimum thickness for manufacturing purposes may be 1/64", (0.015"), whereas if the expected wear is 0.020", the minimum thickness may be 1/32". These values are minimum values based on wear concerns only, and larger bushing thicknesses may be utilized for other reasons such as ease of assembly and handling. For example, a casing material made from M152 and bushing material made from A286 provides a high and unacceptable wear rate as previously discussed. However, a silicon nitride bushing between an A286 vane stem and a M152 case provides an acceptable wear rate, as previously discussed.

Figure 4:
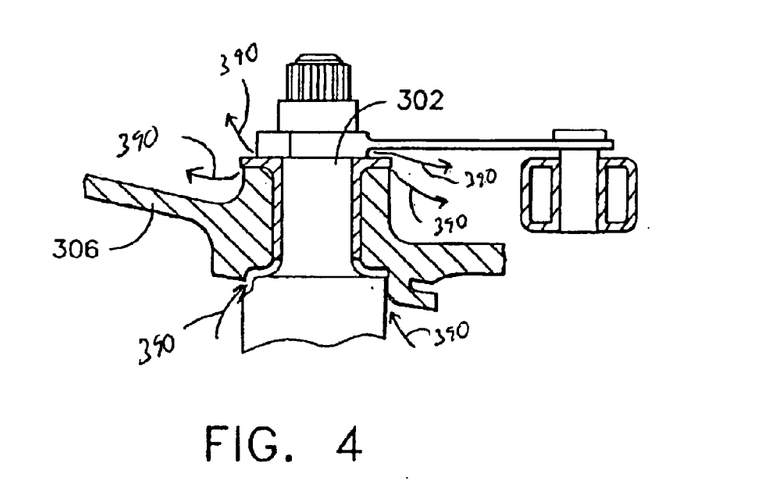
FIG. 4 is a depiction of the leakage path of air across the top portion of the variable stator pivot.

Bushing clearance should be minimized over the operating temperature regime to minimize air leakage between the bushing 216 and the stator vane assembly 106 or casing 112, while still permitting bushing 216 to rotate. The air leakage path as shown by arrows 390 in a variable stator vane arrangement is depicted in FIG. 4, and a bushing having minimal clearance, that is, that substantially fills a gap between the casing 112 and stator vane is desirable. Optimally, when a rotating bushing is used, the bushing first includes a flange, for example, fabricated to position itself horizontally against casing 112, so that the differential pressure between the compressor and exterior of the casing applies a force against the stator vane, which is transmitted against bushing and hence against the casing 306, thereby minimizing air leakage as the gap is closed. Thus, even as the bushing wears due to contact with the casing and stator vane causing a gap, this wear will not result in air leakage as the action of the stator vane against the bushing and against casing 306 will maintain the seal even as the bushing experiences wear. However, the tribological benefits of a rotating bushing are not dependant upon the presence of a bushing flange.

It is preferable that a vane have at least one bearing face to ride against a bushing flange, such as bushing first portion 316 or washer 320 to minimize wear and friction. For example, vane first portion 338 which acts as a bearing surface interfaces with bushing first portion 316. This bearing surface is fabricated with a preselected diameter, the preselected diameter being larger diameter for harder materials which are less likely to wear, such as ceramics and carbides. If however this surface is expected to experience a great deal of wear, such as for example, when the bearing surface is a softer material, such as soft metal as is well known in the art, a composite material, a polymeric material or carbon/graphite material, then the surface will have a smaller preselected diameter This will minimize edge effects, fretting and "digging-in" abrasion. This relationship between diameter size and anticipated wear is also true for the surface of lever arm 348 which bears against, for example, spacer 332, or washer 320 or bushing flange positioned between the casing 306 and spacer 332. The preselected diameter size of the vane itself is relative to the engine design requirements and location of the vane within the compressor, but must fall within the acceptable design requirements for the compressor. For example, the range of preselected diameters for vane shafts in the early stages of a GE-90 compressor used to power Boeing 777 aircraft, which is a very large compressor, can be expected to be significantly greater than the vane shafts in the late stages of a T700 or CT7 compressor used to power helicopters.

Spacer 332, bushing 304 and washer 320 are fabricated to ensure that sliding contact forces transmitted, for example, through lever arm 348, vane stem 346 and shroud 231, FIG. 2, are fully carried by the spacer 332, bushing 304 and washer 320 for the expected design life of the compressor. Washer 320 is designed to remain concentric with rotation of the variable vane 302. In the event that bushings 304 are assemblies constructed of a separate washer 316 and a bushing 318, it is important to prevent washer 316 from riding up against the mating filet radius, here shown on the variable vane 302, as this would create undesirable forces. Preferably, the washer is of an effective, preselected thickness to accommodate the filet of portion 316 and is located concentrically of the variable vane 302. Similarly, washer 320 should be located concentrically and not extend to the edges of spacer 334 nor to the fillet in casing 306 adjacent washer outer diameter surface 322.

Although the bearing assembly of the present invention has been described at the vane stem—casing (outer radial) interface, its principles apply equally well to the vane stem—shroud (inner radial) interface. Returning to FIG. 1, known aircraft gas turbine engines secure the shroud 231 to the vane lower shaft 226 through use of lock pin 234. Because current designs necessitate use of a shortened bushing at the inner radial interface, vane lower shaft 226 at the inner radial interface should be designed to have sufficient length to facilitate use of standard size bushings.

It is advantageous to size the bushing 236 at the inner radial interface and vane such that a standard bushing and vane can provide positioning of the shroud relative to the casing thereby requiring only lock pin 234 and bushing to assure concentricity. The shroud may be split so that two rings pulled together in the axial direction of the engine capture the bushing, or alternatively, multiple segments may be used, which will locate the bushing and seal. Because leakage paths at the shroud do not vent to the bypass channel, leakage losses at this location are of less concern.

Although the present invention has been described in connection with specific examples and embodiments, those skilled in the art will recognize that the present invention is capable of other variations and modifications within its scope. These examples and embodiments are intended as typical of, rather than in any way limiting on, the scope of the present invention as presented in the appended claims.

What is claimed is:

1. A bearing assembly for rotatively positioning a variable vane to an engine casing comprising a bushing wherein a first surface of the bushing contacts a variable vane stem; a second opposed surface of the bushing contacts the engine casing, and, upon installation of the bushing, the bushing rotates relative to the variable vane stem and engine casing.

2. The bearing assembly of claim 1 wherein a rotating bushing clearance is sized to effectively minimize air leakage past the bushing over an engine operating regime.

3. The bearing assembly of claim 1 wherein the bushing further includes a surface positioned such that a pressure differential across the engine casing urges a vane assembly against the bushing, which in turn urges the bushing against an inside wall of the engine casing, thereby closing an air leakage path.

4. The bearing assembly of claim 1 further comprising a first washer, wherein the first washer provides the engine casing a bearing surface, and the bearing surface is prevented from riding up on a filet of the vane stem.

5. The bearing assembly of claim 1 wherein the bushing comprises a first horizontal portion in contact with a recessed portion of the casing and second vertical portion substantially at a right angle to the first portion, the second portion positioned between a substantially vertical portion of the casing and a substantially vertical surface of the vane stem.

6. The bearing assembly of claim 5 wherein the bushing comprises two separate components, a washer portion wherein the washer portion is in contact with a recessed portion of the casing, and a bushing portion substantially at a right angle to the washer portion, the bushing portion positioned between the substantially vertical portion of the casing and the substantially vertical portion of the vane stem.

7. The bearing assembly of claim 6 wherein the washer portion is prevented from riding up on a filet of the vane stem.

8. The bearing assembly of claim 1 wherein the rotating bushing is a soft material that wears in relationship to the a harder variable vane stem.

9. The bearing assembly of claim 8 wherein the bushing is further comprised of silicon nitride.

10. The bearing assembly of claim 9 wherein the silicon nitride bushing has a thickness of at least about 0.050 inches.

11. The bearing assembly of claim 8 wherein the bushing is further comprised of zirconium oxide.

12. The bearing assembly of claim 11 wherein the zirconium oxide bushing has a thickness of at least about 0.050 inches.

13. The bearing assembly of claim 1 wherein the wear rate of the bushing with respect to the vane stem is less than about 0.0002 inches after an effective wear distance of about 50,000 feet.

14. A variable vane assembly for a gas turbine engine comprising:
a variable vane, the vane including a first vane stem at a first vane end and a second vane stem at a second, opposing vane end positioned radially inward toward a center line of the engine;
   a first bearing assembly for rotatively positioning the first vane stem within an outer engine casing;
   a second bearing assembly for rotatively positioning the second vane stem within an inner engine shroud; and
   a lever arm fixedly attached to the first vane stem for variably altering an angular orientation of a vane airfoil;
   the first bearing assembly having a first bushing with an inner diameter wherein the inner diameter of the bushing contacts the first vane stem at the first vane end, and the outer diameter of the bushing contacts the outer engine casing, the bushing preventing contact between the outer engine casing and the first vane stem, the bushing providing a wear surface as the variable vane assembly is moved from a first position to a second position;
   the second bearing assembly having a second bushing with an inner diameter wherein the inner diameter of the bushing contacts the second vane stem at the second end positioned radially inward from the first vane end, and the outer diameter of the bushing contacts the outer engine casing, the bushing preventing contact between a seal and the second vane stem, the bushing providing a wear surface as the variable vane assembly is moved from a first position to a second position; and
   wherein at least one of the first bushing and the second bushing rotates relative to its respective vane stem.

15. The variable vane assembly of claim 14 wherein both the first bushing rotates relative to its vane stem and outer engine casing, and second bushing rotate relative to its vane stem and seal.

16. The variable vane assembly of claim 14 wherein the vane further includes an axial bearing face having preselected diameter adjacent each vane stem.

17. The variable vane assembly of claim 16 wherein at least one of each axial bearing face is fabricated with an effectively larger preselected bearing contact outer diameter when the vane is a harder, less wearing material than the bushing and wherein the bushing is designed to wear, being constructed of a softer material.

18. The variable vane assembly of claim 17 wherein the bushing material is selected from the group consisting of a soft metal, a polymeric material, a carbon/graphite material, a ceramic material and a composite material.

19. The variable vane assembly of claim 17 wherein the bushing material is selected from the group consisting of a ceramic cemented carbon material and a cemented carbide material.

20. The variable vane assembly of claim 16 wherein at least one of each axial bearing face is fabricated with an effectively smaller preselected bearing contact outer diameter when the vane is a softer, wear-type material than the bushing and wherein the bushing is designed not to wear, being constructed of harder, wear resistant materials and not to rotate so as to minimize fretting of the axial bearing face.

21. The variable vane assembly of claim 20 wherein the bushing material is selected from the group consisting of carbide materials, ceramic materials and substrate materials coated with carbide materials and ceramic materials.

22. The variable vane assembly of claim 14 wherein the lever arm includes a bearing face having preselected diameter that bears against the first bushing of the first bearing assembly, wherein the preselected diameter of the bearing face is of an effectively larger preselected outer diameter for harder, less wearing materials when the bushing is designed to wear and is constructed of softer materials, and of an effectively smaller preselected outer diameter for softer wearing materials when the bushing is designed not to wear and is constructed of harder, wear-resistant materials so as to minimize fretting of the lever arm bearing face.

23. The variable vane assembly of claim 14 wherein the second bearing assembly further includes a shroud, the bushing preventing contact between the second vane stem and the shroud, the second bearing assembly being captured by the shroud, the shroud located to minimize vibrational effects of airflow variation and leakage.

* * * * *

UNITED STATES PATENT AND TRADEMARK OFFICE
CERTIFICATE OF CORRECTION

PATENT NO. : 6,887,035 B2
DATED : May 3, 2005
INVENTOR(S) : Bruce

It is certified that error appears in the above-identified patent and that said Letters Patent is hereby corrected as shown below:

Column 4,
Line 43, the phrase "an 120" should read -- arm 120 --.

Signed and Sealed this

Ninth Day of August, 2005

JON W. DUDAS
*Director of the United States Patent and Trademark Office*

UNITED STATES PATENT AND TRADEMARK OFFICE
CERTIFICATE OF CORRECTION

PATENT NO. : 6,887,035 B2
APPLICATION NO. : 10/278570
DATED : May 3, 2005
INVENTOR(S) : Robert W. Bruce It is certified that error appears in the above-identified patent and that said Letters Patent is hereby corrected as shown below:

Column 4, lines 13-14 the sentence "These shrouds are not depicted." should be deleted.

Column 6, line 2 the phrase "vane vane 302" should be replaced with the phrase --variable vane 302--.

Column 6, line 45 the phrase "vane stem 116" should be replaced with the phrase --casing 112--.

Signed and Sealed this

Third Day of April, 2007

JON W. DUDAS
*Director of the United States Patent and Trademark Office*